UNITED STATES PATENT OFFICE.

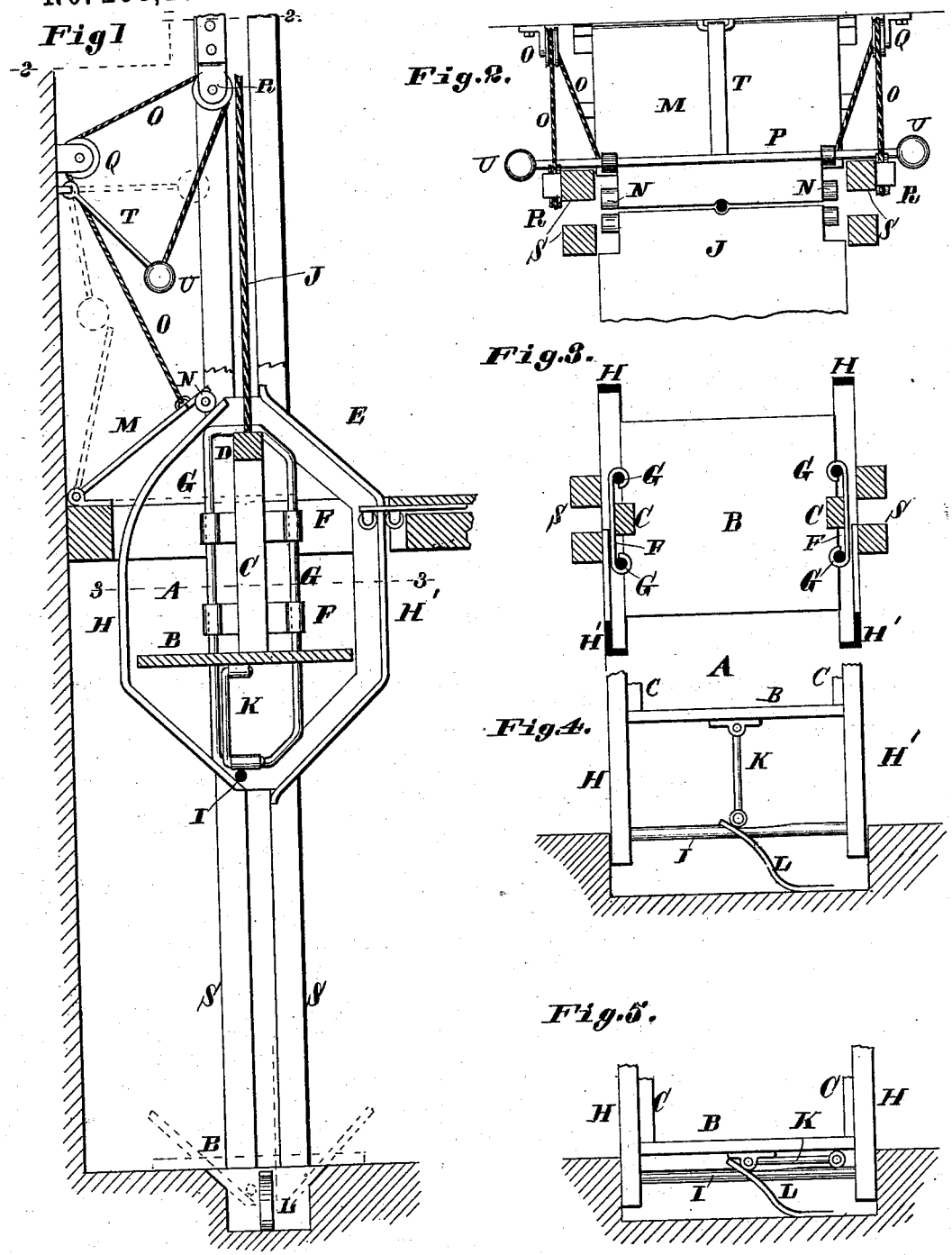

RICHARD D. THACKSTON, OF ST. LOUIS, MISSOURI, ASSIGNOR OF ONE-HALF TO HENRY I. COE, OF SAME PLACE.

SELF-CLOSING HATCHWAY.

SPECIFICATION forming part of Letters Patent No. 268,146, dated November 28, 1882.

Application filed June 28, 1882. (No model.)

*To all whom it may concern:*

Be it known that I, RICHARD D. THACKSTON, of the city of St. Louis, in the State of Missouri, have invented a certain new and useful Improvement in Self-Closing Hatchways, of which the following is a full, clear, and exact description, reference being had to the accompanying drawings, forming part of this specification, and in which—

Figure 1 is a vertical section. Fig. 2 is a horizontal section on line 2 2, Fig. 1. Fig. 3 is a horizontal section on line 3 3, Fig. 1, and Figs. 4 and 5 are detail front views.

My invention relates, first, to the manner of constructing one of the hatch-doors—the one next to the wall of the building—so that it will open vertically, and require no opening to slide into, as it would were it to open on a horizontal plane.

My invention relates, secondly, to so constructing the cage and its frame that the former will slide in the latter a short distance, thus avoiding the necessity of making a large hole either in the floor or in the top of the building to receive the frame, and preventing the cage striking the doors.

My invention relates, thirdly, to the means of preventing the cage moving in the frame when the latter strikes the hatch-doors to open them on the descent of the elevator.

A represents the cage, which consists of a floor, B, side pieces, C, and top piece, D. It is secured to its frame E by strips F, which are rigidly secured to the side pieces, C, of the cage, and so secured to vertical rods G of the frame that they will slide thereon a short distance each time the elevator is raised and lowered. The frame consists of the vertical rods G and cam sides H H', to which the rods are secured, as shown in Fig. 1. The sides are connected by suitable connecting-strips and by a bar or rod, I, at bottom. The side H' is made from angle-iron, and operates its horizontally-moving door by engaging between friction-wheels secured to the door. As these forms of side and door are old, (see patent to John Fensom, July 13, 1875,) they need no particular description here. The side H consists of a plain cam, which operates its vertically-moving door as hereinafter described. By thus making the cage to slide within its frame each time the elevator is raised and lowered from and to the floor, it will be seen that it can descend to the level of the floor without there having to be a large hole made to receive the lower end of the frame, and also but little room is required above the top floor of the building to receive the upper end of the frame. The cage cannot occupy a lower position in the frame when passing through the hatchways than the position shown in Fig. 1, which is its upper position, because it would strike and interfere with the working of the doors.

The hoisting rope or cable J is secured to the top piece, D, so that on the ascent of the elevator the cage is first raised within its frame, and on the descent of the elevator the frame is first stopped by coming in contact with the lower floor of the building, and the cage continues to descend till it reaches the floor, as shown by dotted lines, Fig. 1.

It is necessary to provide a means to prevent the cage sliding in the frame on the descent of the elevator when the latter comes against the doors to open them. This is accomplished by means of a gravitating arm, K, pivoted to the bottom of the cage. Its lower end is bent at right angles and rests upon (when the cage is raised in the frame) the connecting rod or bar I. As the elevator descends to the ground floor of the building, the arm is knocked out or to one side by a spring or other cam, L, arranged in the small opening which receives the extreme lower end of the frame. Thus the arm does not prevent the cage sliding in the frame at the proper time.

I will now proceed to describe the part of my invention that applies to the vertically-moving door. This door is lettered M, and it is provided with friction-rollers N, which receive the side H of the frame as the door is opened. This door is connected by means of light ropes O O to a cross-bar, P. The ropes pass upward from the door through grooved pulleys Q Q, secured to the wall of the building, thence through pulleys R R, secured to the upright guides S S of the elevator, and from there they pass to and are secured to the said cross-bar. The cross-bar has an arm, T, whose other end has a joint connection with the wall of the building. Thus the arm will move in the radius of a circle, as shown in Fig. 1. The ends of the bar have counterbalance-balls U U. Now, as the door is raised by the ascending elevator the bar P falls into its lowest position. Then as the frame leaves the door its weight will cause it to gravitate to a closed position, raising the bar P. Then as the elevator descends the lower part of the frame H will come against the bar P, carrying it down and raising the door, allowing the elevator to pass through the hatchway.

I claim as my invention—

1. In a self-closing hatchway, the combination of cage and frame, constructed substantially as described, the former adapted to have vertical movement in the latter, as and for the purposes set forth.

2. The combination of cage A and frame E, movable thereon, connected together by plates F and vertical rods G, secured respectively to the cage and frame, substantially as shown and described, for the purpose set forth.

3. The combination of cage A, frame E, movable thereon, connecting-rod I, arm K, and cam L, all constructed substantially as and for the purpose set forth.

4. The combination of cage A, frame E, door M, connected to the bar or rod P by ropes O, passing over pulleys, and the rod having counterbalance-balls U and connecting-arm T, all constructed and arranged substantially as and for the purpose set forth.

RICHARD D. THACKSTON.

Witnesses:
SAML. KNIGHT,
GEO. H. KNIGHT.